March 2, 1948. H. A. WELLS 2,436,844
RESILIENT WHEEL
Filed Nov. 24, 1943 2 Sheets-Sheet 1

Inventor
HOMER A. WELLS

By Clarence A. O'Brien
and Harvey B. Jacobson
Attorneys

March 2, 1948.    H. A. WELLS    2,436,844
RESILIENT WHEEL
Filed Nov. 24, 1943    2 Sheets-Sheet 2
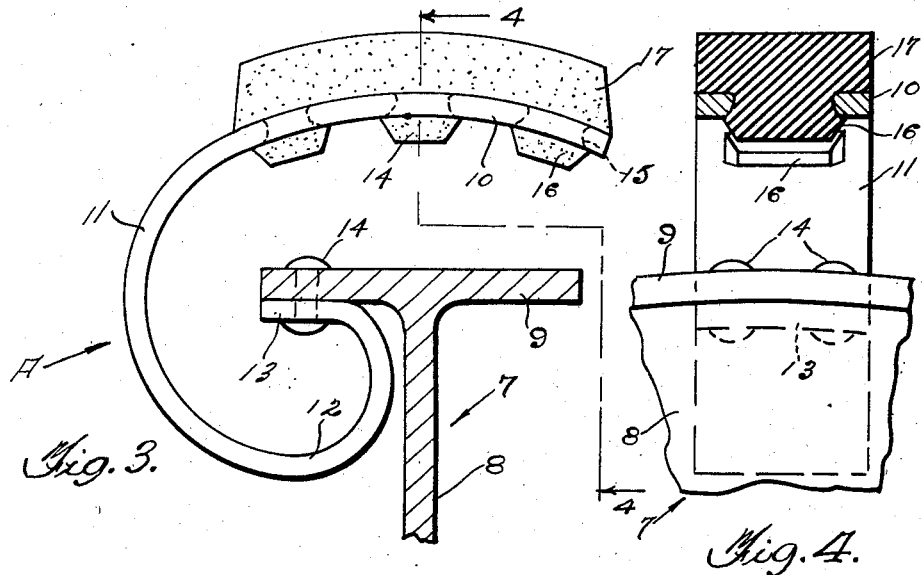
Fig. 3.
Fig. 4.
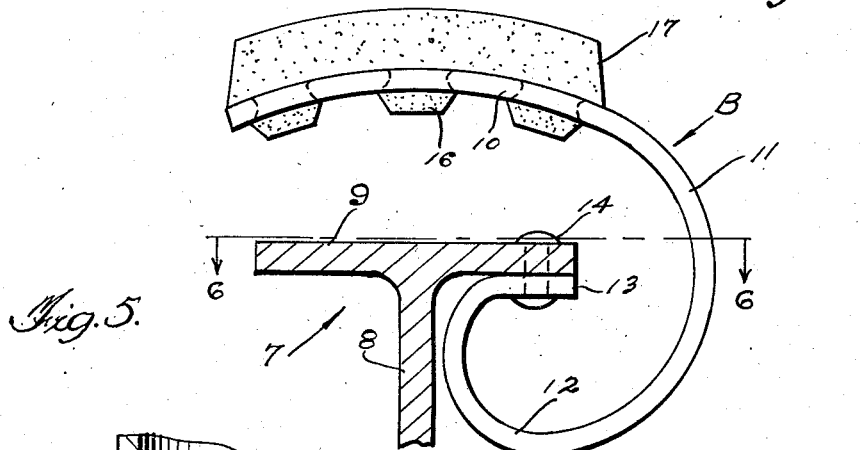
Fig. 5.
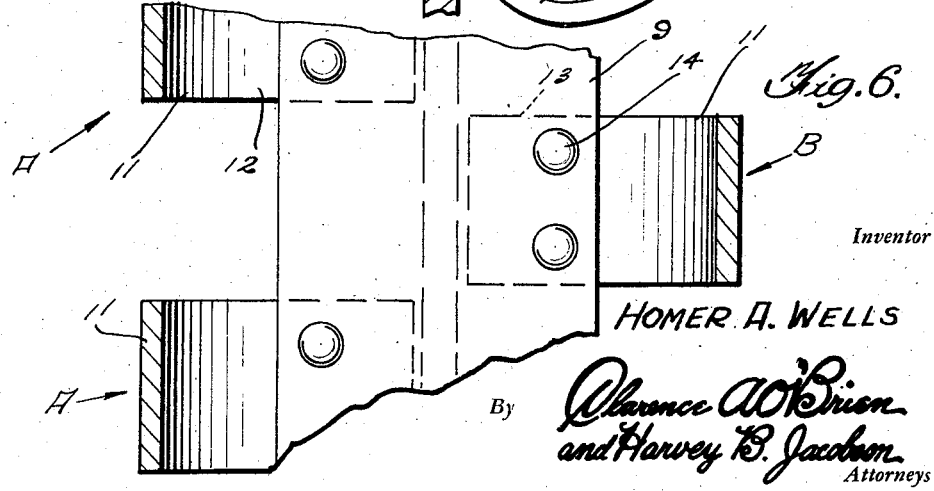
Fig. 6.
Inventor
HOMER A. WELLS
By Clarence A. O'Brien
and Harvey B. Jacobson
Attorneys Patented Mar. 2, 1948

2,436,844

UNITED STATES PATENT OFFICE 2,436,844

RESILIENT WHEEL

Homer A. Wells, Sacramento, Calif.

Application November 24, 1943, Serial No. 511,589

2 Claims. (Cl. 152—280)

This invention relates broadly to resilient wheels and tires, the same having more particular reference to a structural adaptation which though usable on automobiles and trucks, is presumably more satisfactorily adapted to tractors, wheelbarrows and vehicles and conveyances in the latter category.

Envisioned on the basis of more explicit lines, I have in mind the provision of a suitable and satisfactory wheel construction characterized by a hub and an appropriate felly or rim, and resilient tread means coacting with said rim, the tread means being in the nature of a "tire" in that it embodies a combination and association of suitably shaped and mounted springs and rubber or equivalent pad-like treads carried by the free ends of said springs.

The specific adaptation, which is the preferred embodiment of my invention, is thought to be novel, compared to analogous prior art structures, in that the coacting parts or elements are sturdily designed and specially coordinated and are otherwise fashioned and mounted to provide an adequate and economical assemblage not only aptly but appropriately constructed to measure up to the standards of a resilient tread structure for traction wheels of the general types specified.

Other features and advantages will become more readily apparent from the following description and the accompanying illustrative drawings.

In the drawings, wherein like numerals are employed to designate like parts throughout the views—

Figure 3 is an enlarged section on the line 3—3 of Figure 1, looking in the direction of the arrows.

Figure 4 is a section on the irregular line 4—4 of Figure 3.

Figure 5 is a view similar to Figure 3, this taken on the plane of the line 5—5 of Figure 1.

Figure 6 is a horizontal fragmentary sectional and elevational view taken on the plane of the line 6—6 of Figure 5.

Figure 1:
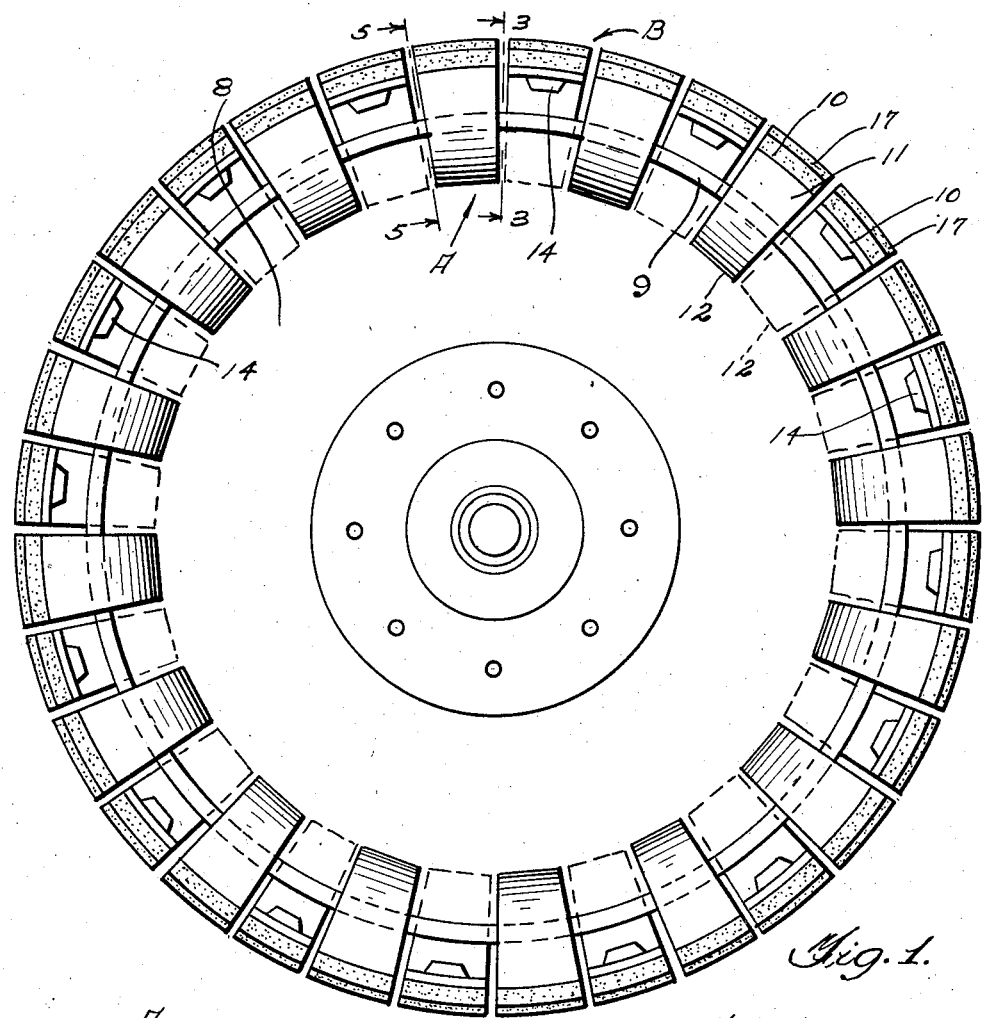
Figure 1 is a side elevational view of a wheel embodying a resilient tread construction perfected in accordance with the principles of the instant invention.
Figure 2:
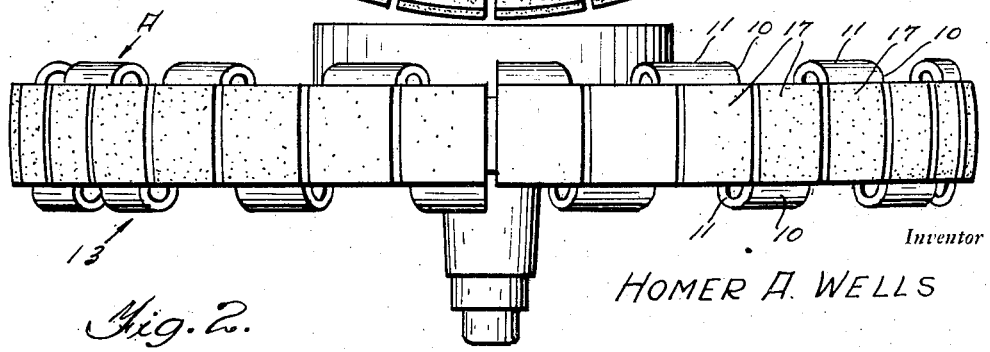
Figure 2 is a marginal edge elevation of the structure seen in Figure 1.

It is understood that the wheel or hub foundation 7 may be of any appropriate type. It is here shown as in the form of a hub having a disk-like web and a felly, the web being denoted at 8 and the felly at 9. In cross section the configuration of the parts 8 and 9 is substantially T-shaped.

The distinguishable alternating staggered and complemental units which go to make up the tread or "tire" are denoted by the reference characters A and B, respectively. All of the units, however, are the same in construction and the description of one will suffice for any or all. To this end each unit comprises a flat metal spring whose free end portion 10 overlies the rim or felly 9. This is bowed to assume an arcuate curvature of desired degree. The intermediate portion of the spring, as indicated at 11, is somewhat C-shaped in form and this merges into a return bend 12 whose terminal 13 underlies the rim and is riveted or otherwise fastened thereto as indicated at 14. The portions 10, 11 and 12 are individually flexible, as it were, and collectively coordinate to properly anchor the spring strap and to at the same time place the portion 10 appropriately in a direction radially outward of the rim 9. This portion 10 is provided with longitudinally spaced apertures 15 to accommodate the substantially rectangular anchoring and assembling lugs 16 on the rectangular block-like pads 17. The pads and lugs are obviously integral and are moulded on the metal foundation formed by the part 10. Thus, each pad becomes a tread element and all of the elements in conjunction with their foundation portions 10 constitute the complete sectional resilient tread for the wheel.

While the intermediate portion of the spring adapter and anchoring element is said to be of approximate C-shaped formed it will be noticed that the complete spring, when it is finally bent and looking at it from end to end is, to an extent, approximately G-shaped. Consequently, we have a series of circumferentially spaced G-shaped springs attached in alternate steps to opposite marginal edges of the rim 9, all of the rubber pads being in line and thus circumferentially spaced about the periphery of the wheel. The overall assemblage of parts coordinates with the wheel in providing combination rubber and metal resilient tread means.

As before mentioned it is submitted that a wheel equipped with a close nested sectional tread unit such as herein shown and described is reasonably well suited to heavy duty service, the same being especially useful on wheelbarrows and carts in the same general category as well as on tractors. Perhaps too, and in emergency conditions the improved wheel and tread can be employed on small trucks, and even on automobiles. I am not unmindful that such a structure is not a matchable substitute for pneumatic tires, though it has its place in the broad class of wheel structures when used in such limited manners as will be best adopted and recognized by manufacturers and users.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the scope of the subjoined claims may be resorted to in actual practice, if desired.

Having described the invention, what is claimed as new is:

1. As a new article of manufacture and a component part of a resilient wheel of the class described, a flat spring longitudinally bowed between its ends and bent into G-shaped form in marginal edge view and including, at one end, a return bend terminating in straight attaching tip suitable for attachment to an annular wheel felly, the opposite outer end of said spring being apertured, and an elongated block-like rubber pad, said pad being provided with lugs moulded into the apertures to secure the pad in place.

2. In a resilient wheel construction of the class described, a wheel comprising a central hub, a disc-like web portion extending radially from said hub and an annular felly surrounding the outer marginal portion of said web and defining a rim structure which is substantially T-shaped in cross section, and a plurality of adapter springs, each spring being of flat formation, longitudinally bowed between its ends and bent into G-shaped form in marginal edge view and including, at one end, a return bend terminating in a straight attaching tip, the attaching tips of the adjacent pairs of adapter springs being secured to the inner peripheral portions of said felly and in alternate order on opposite sides of the web, the outer free end portions of the respective adapter springs overlying the outer peripheral surface of said felly in radially spaced relation, and resilient pads carried by the outer surfaces of the free end portions of said springs, the respective and adjacent pads being in close spaced relationship and independently operable but assuming collective positions to provide a resilient tread surrounding the entire felly.

HOMER A. WELLS.

REFERENCES CITED

The following references are of record in the file of this patent:

UNITED STATES PATENTS

| Number | Name | Date |
|---|---|---|
| 1,549,560 | Noriega | Aug. 11, 1925 |
| 1,339,439 | Downing | May 11, 1920 |
| 1,422,818 | Benjamins | July 18, 1922 |
| 988,085 | Fox | Mar. 28, 1911 |
| 658,920 | Lieberthal | Oct. 2, 1900 |
| 1,137,518 | Neuhausen | Apr. 27, 1915 |
| 808,426 | Adsit | Dec. 26, 1905 |
| 1,498,711 | Yeazel | June 24, 1924 |
| 1,174,879 | Lotter | Mar. 7, 1916 |

FOREIGN PATENTS

| Number | Country | Date |
|---|---|---|
| 9,633 | France | 1908 |